(12) United States Patent
Fischer et al.

(10) Patent No.: US 7,302,393 B2
(45) Date of Patent: Nov. 27, 2007

(54) SENSOR BASED APPROACH RECOGNIZER SELECTION, ADAPTATION AND COMBINATION

(75) Inventors: Volker Fischer, Leimen (DE); Siegfried Kunzmann, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 10/539,454

(22) PCT Filed: Oct. 31, 2003

(86) PCT No.: PCT/EP03/12168

§ 371 (c)(1), (2), (4) Date: Jun. 17, 2005

(87) PCT Pub. No.: WO2004/057574

PCT Pub. Date: Jul. 8, 2004

(65) Prior Publication Data
US 2006/0173684 A1    Aug. 3, 2006

(30) Foreign Application Priority Data
Dec. 20, 2002  (EP)  .................................. 02102875

(51) Int. Cl.
*G10L 15/20* (2006.01)
(52) U.S. Cl. .................................................... 704/254
(58) Field of Classification Search .................. 704/254
See application file for complete search history.

(56) References Cited

U.S. PATENT DOCUMENTS

| | | | |
|---|---|---|---|
| 6,418,411 B1 | 7/2002 | Gong | |
| 6,789,061 B1 * | 9/2004 | Fischer et al. | 704/240 |
| 6,999,925 B2 * | 2/2006 | Fischer et al. | 704/243 |
| 7,162,423 B2 * | 1/2007 | Thrasher et al. | 704/251 |
| 2002/0065584 A1 | 5/2002 | Kellner et al. | |

FOREIGN PATENT DOCUMENTS

| | | |
|---|---|---|
| EP | 0094449 | 11/1983 |
| EP | 0881625 | 12/1998 |
| KR | 0336994 | 2/2001 |

OTHER PUBLICATIONS

Gales, M.F.J., et al., "Robust speech recognition in additive and convolutional noise using parallel model combination", Comp. Sp. & Lang., vol. 9, No. 4, Oct. 1995.

* cited by examiner

*Primary Examiner*—Susan McFadden
(74) *Attorney, Agent, or Firm*—Akerman Senterfitt

(57) ABSTRACT

A method and respective system for operating a speech recognition system, in which a plurality of recognizer programs are accessible to be activated for speech recognition, and are combined on a per need basis in order to efficiently improve the results of speech recognition done by a single recognizer. In order to adapt such system to the dynamically changing acoustic conditions of various operating environments and to the particular requirements of running in embedded systems having only a limited computing power available, it is proposed to a) collect selection base data characterizing speech recognition boundary conditions, e.g. the speaker person and the environmental noise, etc., with sensor means, and b) using program-controlled arbiter means for evaluating the collected data, e.g., a decision engine including software mechanism and a physical sensor, to select the best suited recognizer or a combination thereof out of the plurality of available recognizers.

12 Claims, 2 Drawing Sheets

SENSOR BASED APPROACH RECOGNIZER SELECTION, ADAPTATION AND COMBINATION

1. BACKGROUND OF THE INVENTION

1.1. Field of the Invention

Figure 1:
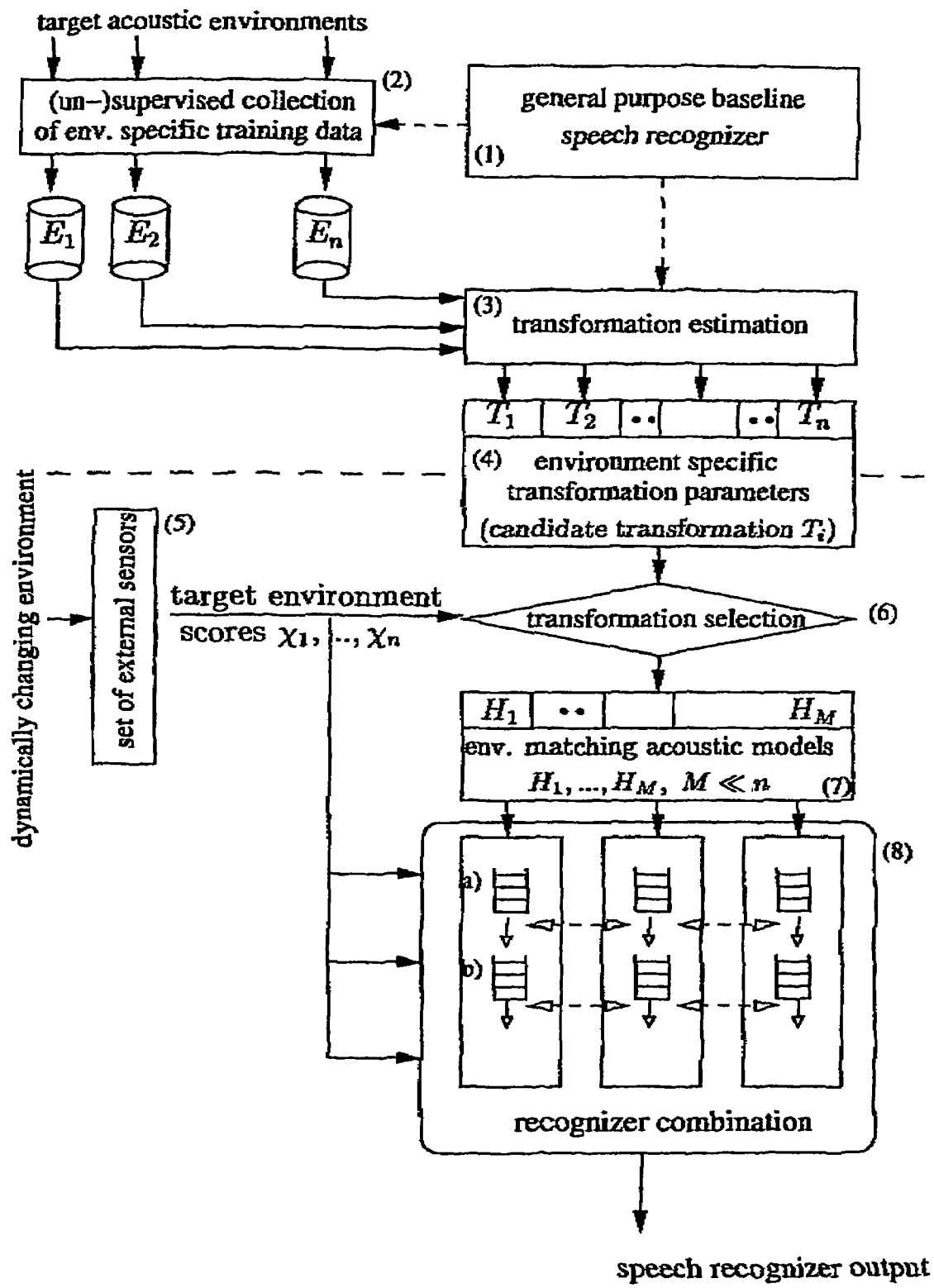

The present invention relates to the field of computerized speech recognition.

1.2. Description and Disadvantages of Prior Art

In particular, the present invention relates to a method for operating a large vocabulary speech recognition system, in which a program-controlled recognizer performs the steps of:

1. dissecting a speech signal into short time intervals, i.e., frames, not necessarily of equal length yielding an extracted feature vector for each frames, e.g. comprising spectral coefficients,
2. labelling frames by characters or groups of them yielding a plurality of labels per frame,
3. decoding said labels to construct one or more words or fragments of a word,
4. in which method a plurality of recognizers are accessible to be activated for speech recognition, and are combined on an on-demand basis in order to improve the results of speech recognition done by a single recognizer.

More particularly, such above mentioned continuous speech recognizers capture the many variations of speech sounds by modelling context dependent subword units, like e.g., phones or triphones, as elementary Hidden Markov Models, further referred to as "HMM". Statistical parameters of these models are usually estimated from several hundred hours of labelled training data. While this allows a high recognition accuracy if the training data sufficiently matches the acoustic characteristics of the application scenario, it can be observed that recognition accuracy significantly decreases if the speech recognizer has to cope with acoustic environments with significant different, and possibly highly dynamically varying characteristics.

Both online and (un-)supervised batch adaptation techniques tackle the problem by a re-estimation of the acoustic model parameters, but are either infeasible if only a very small amount of data is available and/or the computational resources are sparse, or—in case of batch adaptation—can not properly deal with dynamic changes in the acoustic environment.

Today's large vocabulary continuous speech recognizers employ Hidden Markov Models (HMM) to compute a word sequence w with maximum a posteriori probability from a speech signal.

A Hidden Markov Model is a stochastic automaton $\square=(\pi, A, B)$ that operates on a finite set of states $S=\{s_1, \ldots, s_N\}$ and allows for the observation of an output each time t, $t=1, 2, \ldots, \square$, a state is occupied.

The initial state vector $$\pi=[\pi_i]=[P(s(1)=s_i)], \ 1 \leq i \leq N \quad (1)$$

gives the probabilities that the HMM is in state $s_i$ at time $t=1$, and the transition matrix $$A=[a_{ij}]=[P(s(t+1)=s_j|s(t)=s_i)], \ 1 \leq i, j \leq N \quad (2)$$

holds the probabilities of a first order time invariant process that describes the transitions from state $s_i$ to $s_j$. The observations are continuous valued feature vectors $x \in R$ derived from the speech signal, and the output probabilities are defined by a set of probability density function, further referred to herein as pdfs:

$$B: [b_i]=[p(x|s(t)=s_i)], \ 1 \leq i \leq N \quad (3)$$

For any given HM state $s_i$ the unknown distribution $p(x|s_i)$ is usually approximated by a mixture of elementary Gaussian pdfs $$p(x|s_i) = \sum_{j \in M_i} (w_{ji} \cdot N(x|\mu_{ji}, \Gamma_{ji})) \quad (4)$$

$$= \sum_{j \in M_i} \left( \begin{array}{c} w_{ji} \cdot |2\pi \Gamma_{ji}|^{-1/2} \cdot \\ \exp(-(x-\mu_{ji})_T \Gamma_{ji}^{-1}(x-\mu_{ji})/2) \end{array} \right),$$

where $M_i$ is the set of Gaussians associated with state $s_i$. Furthermore, x denotes the observed feature vector, $w_{ji}$ is the j-th mixture component weight for the i-th output distribution, and $\mu_{ji}$ and $\Gamma_{ji}$ are the mean and covariance matrix of the j-th Gaussian in state $s_i$. It should be noted that state and mixture component index of the mean vectors from Eqn. 4 are omitted for simplicity of notation.

State-of-the-art speech recognizers usually consist of the following components:

- Feature extraction computes a parametric representation that allows the classification of short portions (frames) of the signal. Frequently used features are either spectral parameters or Mel-Frequency-Cepstrum coefficients (MFCC) which are often enriched by energy values and their time derivatives.
- A "labeller" tags each feature vector with a number of labels that represent possible meaningful sub-word units such as a context dependent phones or subphones. Common techniques for the classification of feature vectors include, for example, statistical classification with Gaussian mixture densities or classification by use of a neural network.
- A "decoder" interprets each label as the output of a HMM and computes a word sequence of maximum a posteriori probability. In order to efficiently cope with alternative results from the labelling step search strategies and pruning techniques are employed. Popular examples are asynchronous stack decoding and time synchronous Viterbi decoding or beam search.

It has been demonstrated recently that a significant reduction in word error rate can be achieved by the combination of (intermediate) results from several base recognizers that run in parallel. Three main approaches can be distinguished:

- Feature combination methods compute different sets of features and compose them into a single feature vector that is passed to the labeller.
- Likelihood combination methods also compute different feature vectors, but classify them separately. Results from different labelling steps are combined based on their evidence, and for each frame a single vector of alternative labels is passed to the decoder.
- ROVER (Recognizer Output Voting Error Reduction) is a post-processing method that uses a dynamic programming technique to merge the outputs from several decoder passes into a single word hypothesis network. At each branching point of the combined network a subsequent voting mechanism selects the word with the highest score for the final transcription.

It is the main goal of the invention proposed here to overcome some problems associated with these methods, while simultaneously maintaining the increased recognition accuracy.

Introduction to the Problem

It is well known in prior that the recognition accuracy of a speech recognizer decreases significantly if used in an acoustic environment that is not properly represented in the training data. In applications such as desktop dictation this problem can easily be tackled by allowing the end user to enrol to the system in different environments, and methods for the normalization of the incoming feature vectors may be considered as well. However, facing the important role of speech as an input medium in pervasive computing, there is a growing number of applications that do not allow an upfront adaptation step. Moreover, if the recognizer has to deal with a potentially large number of dynamically changing acoustic environments, adaptation methods may become infeasible either due to a lack of a sufficient amount of online adaptation data or because of limited computational resources.

A more accurate acoustic model with a very large number of parameters may help to overcome this situation, but is not feasible in typical applications targeted in the invention reported here. These are—amongst others—applications such as interactive voice response solutions, voice driven interfaces for consumer devices (mobile phones, PDAs, home appliances), and low resource speech recognition in the car.

It has been proven in the literature that the combination methods mentioned above can yield significant better accuracy in noisy environments than a single base recognizer. However, these methods impose an increasing computational load to the CPU and also require an increased amount of memory for the storage of several acoustic models and intermediate results; therefore they are not yet suited for low resource speech recognizers.

1.3. OBJECTIVES OF THE INVENTION

It is thus an objective of the present invention to provide a speech recognition method and system, which is adapted to dynamically changing noise in the environment of the speaker, and to the particular requirements of running in (embedded) systems having only a limited computing power available, due to their limited resources.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the basic aspect of the present invention it is proposed to perform the following steps within the speech recognition system:

a) collecting selection base data characterizing speech recognition boundary conditions, e.g. the speaker person, the environmental noise with sensor means, b) using program-controlled arbiter means for evaluating the collected data, i.e., a decision engine, including software mechanism, physical sensor, a combination thereof, etc., c) selecting the best suited recognizer or a combination thereof out of the plurality of available recognizers according to said evaluation.

By that, a significant advantage can be achieved in environments that have a varying noise level, and in which a plurality of "sensing means" already exist. A sensor means is thereby to be understood very broadly, just to define any arrangement, if physical or just in a logical program form, which is able to supply said selection base data, which can be evaluated by a computer program with or without an additional user input, in order to increase the knowledge of the details defining the current speaking situation, motivated by the idea that an increased knowledge will increase the recognition rate. Thus, a sensor means may advantageously be a decision logic, including a software program, which interprets some base data, which may be sensed by any physical sensor, like a microphone which may for example sense the noise generated by driving with a particular speed, in a particular car model, having winter/or summer pneus mounted, etc., a camera, ON/OFF positions of noise generating devices (e.g. a ventilator device, music) evaluated from other available data, or may be requested from the user. Of course, a combination of them may also be used. Thus, some processing of the collected sensed data is considered to be included within the sensor means.

Further, the following steps may be advantageously added for an efficient evaluation:

a) processing a physical sensor output in a decision logic implementing one or more of: statistical tests, decision trees, fuzzy membership functions, b) returning from said process a confidence value to be used in the sensor select/combine decision.

Further, the user may also contribute to this process by adding a rating criterion, e.g., a number-scale-based criterion or either of "good", "medium", "bad", etc., saying how "good" was the speech recognition under a set of conditions, which were defined according to the before-mentioned processing.

Further, said selection base data which have led to a recognizer select decision, is advantageously stored in a database for a repeated fast selection of recognizers. This enables to make a recognizer select decision based primarily on a lookup in the database, and possibly some additional plausibility test, instead of running through the complete select decision logic. Thus, computing resources may be saved.

Further, according to a preferred aspect of the invention it is proposed to select the number of recognizers dependent of the current system load. This is preferably advantageous in embedded systems with limited computational resources, as—for example—deployed in cars.

Further, according to another preferred aspect of the invention it is proposed to provide upfront estimates of model transformations for a variety of conditions that are typical for the application under consideration. This is done preferably by storing only the mapping rule how one recognition model is transformed to another one instead of storing a plurality of models themselves. This helps to save storage space and enables for calculating different models on-the-fly during runtime of the speech recognition system.

Thus, mechanisms are provided for the selection of one or more transformations that best suit for operation in the current acoustic environment, and methods are proposed for the dynamic combination of recognizers that yields improved recognition accuracy in noisy environments, which change over time quite frequently.

The architecture of the present invention allows an improved accuracy for speech recognition applications that have to deal with highly varying acoustic environments, and moreover, it also offers a scalable recognition accuracy in cases of changeable computational resources by limiting the number of recognizers combined.

The invention introduced herein aims on an increased robustness of a general purpose HMM based speech recognizer in adverse acoustic environments. It tackles the problems described in the prior discussion above by employing a sensor based approach for the dynamic creation of acoustic models and their combination.

Environment specific recognizers are dynamically created by the application of one or more model transformations to the original acoustic model. Different from online adaptation techniques, suitable transformations are not computed during runtime, but are determined in an upfront training step. The general acoustic model and the environment specific transformations are stored together with associated indicator functions that allow a sensor based selection of transformations during runtime. This ensures the creation and use of models that best match the characteristics of the current acoustic environment. Because model transformations not identified by the sensor(s) are not used in the combination of recognition processes, we obtain better accuracy without an unnecessary increase of computational resources. Furthermore, storing pre-computed transformations requires much less memory than the storage of adapted models.

According to the present invention it is proposed to retrieve information that characterizes the speech recognizers operating acoustic environment by means of one or a plurality of external sensors and to use this information for the dynamic creation and combination of one or more acoustic models.

Methods for the weighted combination of models are not in the scope of the present invention. However, it is an original idea of the invention described here, to create these models by making use of environment specific, pre-computed model transformations. Besides the already mentioned advantage of requiring less storage capacity, this also avoids the computation of different feature vectors, which is a computationally expensive step in sub-band based approaches.

3. BRIEF DESCRIPTION OF THE DRAWINGS

Figure 2:
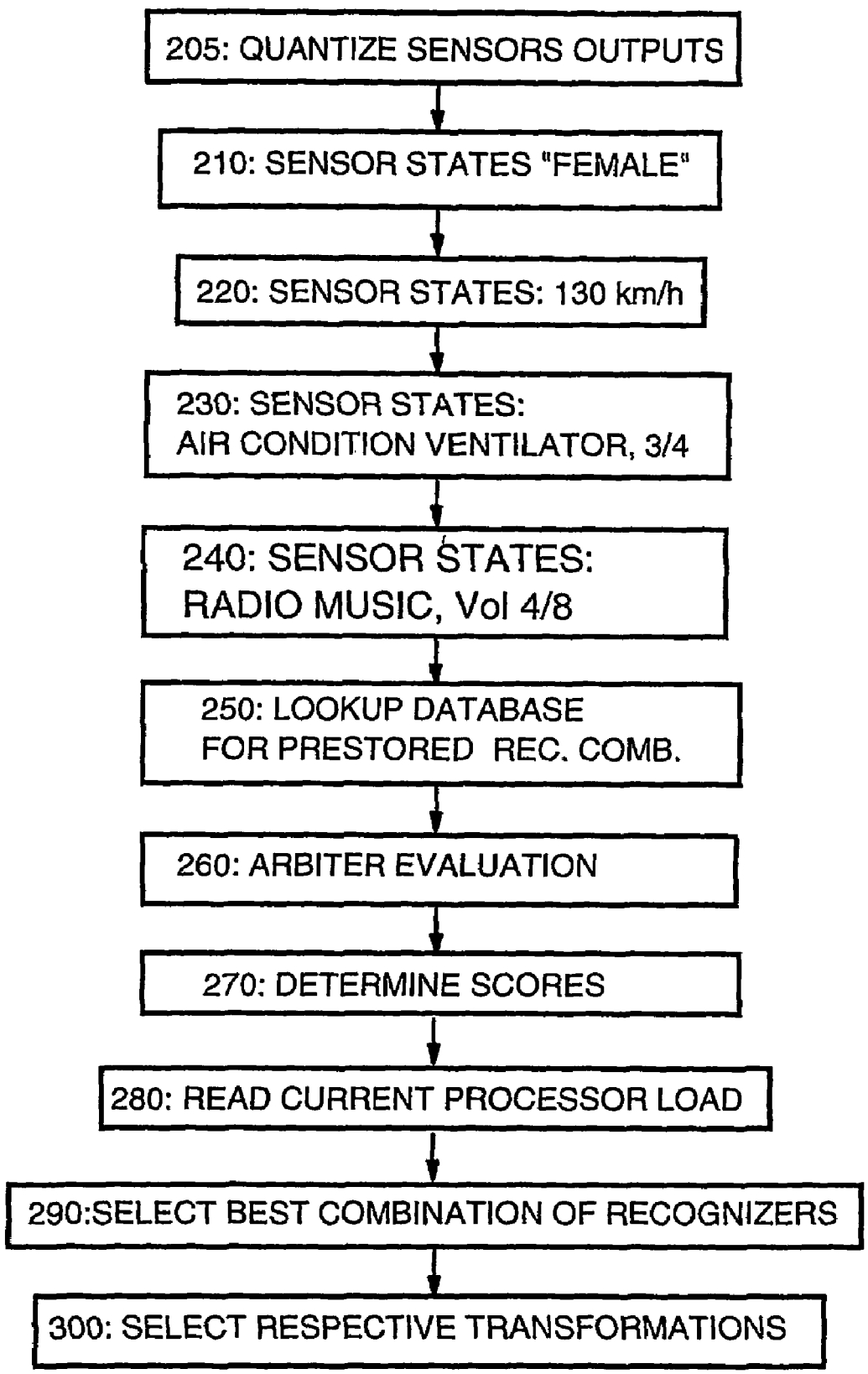

The present invention is illustrated by way of example and is not limited by the shape of the figures of the drawings in which:

FIG. 1 is a schematic block diagram representation giving an overview of the inventional concept according to a preferred embodiment thereof, FIG. 2 is a schematic block diagram representation giving an overview of the inventional basic concept in an exemplary application in the field of telematics, applied in an embedded system in a car.

4. DETAILED DESCRIPTION OF THE PREFERRED EMBODIMENT

With general reference to the figures and with special reference now to FIG. 1 a preferred embodiment of the inventional method and system is described in more detail:

A general purpose baseline speech recognizer 1 is used for the collection of training speech data y—reference sign 2—from a variety of acoustic environments $E_j$ that are characteristic of a certain application. The environment specific training data y is collected either supervised or unsupervised, and is used for the computation of acoustic model transformations for each of the operating environments under consideration, see block 3. In the following, two examples are given that illustrate the feature of using pre-stored transformations:

MLLR (Maximum-Likelihood Linear Regression) adaptation updates the HMM mean vectors (cf. Eqn. 4) by use of a linear transformation $$\mu^{(adapt)} = W\mu^{(base)} + \square,$$

where the transformation parameters W and $\square$ are determined in order to maximize the likelihood of the adaptation data y. It should be noted that state and mixture component index of the mean vectors from Eqn. 4 are omitted for sake of simplicity of the notation. Different transformations may be applied to mean vectors belonging to different (phone or allophone) classes; consider, for example, a specific transformation for speech and silence mean vectors as a simple example. In any case, this results in a set of transformation parameters $$T_j = \{W_i, \square_i | i=1, \ldots, n_j\}$$

for each environment $E_j$.

Parallel Model Combination (PMC) estimates the parameters of a "noise" HMM $\square_j^{(noise)} = (\square, A, B)_j$, cf. Eqn. 1-3, which models the influence of the environment $E_j$ and is combined with the "clean" (or environment independent) HMMs of the baseline recognizer. Therefore the transformation parameters are given by the . . . parameters of the "noise" HMM, i.e.:

$$T_j = \{(p, A, B)_j\}$$

The application of pre-computed, environment-specific transformations during runtime and the combination of the resultant acoustic models requires a characterization of the acoustic environment both during recognizer training and runtime. For that purpose according to this inventional embodiment a sensor is used that can be thought of as an external (physical) device or a computer program (software) or a combination of them that computes a quantity that is meaningful in the scope of the invention.

The runtime selection of one or more model transformations, which is performed in block 6, that are applied to the baseline model is based on the output provided by a set 5 of sensors $d_k$, that continuously monitor the relevant parameters of the environment. For that purpose, the sensor output is passed through a decision logic that can employ methods such as statistical tests, (binary) decision trees, or fuzzy membership functions, and returns a confidence score $X_j$, $1 \leq j \leq n$, for each of the environments under consideration. It should be noted that parameters for these tests are preferably obtained during the processing of adaptation data for model transformation estimation. Again, this idea is illustrated by an example, describing how to determine parameters of a fuzzy membership function for environment $E_j$:

During recognizer training the adaptation data y is passed to the set 5 of sensors that may measure any feature derived from the speech signal itself or any external quantity that is useful in order to describe the acoustics of the environment of the adaptation data.

Sensor output $z = d_k(y)$ is quantized and stored in a histogram which gives the relative frequency of observing z in environment $E_j$. Subsequently, the histogram can be either approximated by a (multi-variate) probability density function or can be used for the direct lookup of relative frequencies that may serve as confidence measure during runtime.

A fuzzy membership function $X_{jk}$ for sensor $d_k$ and environment $E_j$ can be constructed from the histogram by the selection of definition of a piece-wise linear function over a feature z:

$X_{jk}(z)=0$, if z less or equal $z_1$, or z greater or equal $z_4$;
$X_{jk}(z)=z/(z_2-z_1)$, if $z_1$ less z, and z less $z_2$;
$X_{jk}(z)=1$, if $z_2$ less or equal z, and z less or equal $z_3$;
$X_{jk}(z)=1-z/(z_4-z_3)$, if $z_2$ less or equal z, and z less or equal $z_3$;

where the feature values $z_i$, $1 \leq i \leq 4$, are chosen so that $p(z \leq z_i)=q_i$. The probabilities $q_i$ are typically chosen to identify rare and less frequent values of z (e.g. $q_1=0.05$, $q_2=0.20$, $q_3=0.85$, and $q_4=0.95$). Again, this should be understood as an exemplary definition only.

If several sensors are used to monitor the environment, their individual confidence scores $X_{jk}$ are combined in order to obtain a final score for a particular environment $E_j$; e.g. in case of fuzzy scores by taking the minimum $$X_j = \min_k \{X_{jk}\},$$

which corresponds to a logical "AND" operation. Of course, any other operation defined on a fuzzy set may be used as well.

Further, the features for environment (or transformation) selection can be computed with a frame rate other than the one used by the speech recognizer, and will usually be averaged over a certain time interval in order to gain robustness against outliers. They may be either computed from the speech signal itself or any other quantity that is known to affect the acoustic environment. While the signal-to-noise ratio (SNR) may be considered as one of the most important parameters to be computed from the speech signal itself, one may also think of features such as the actual speed of a moving car or the road surface, or the utilization of knowledge on the speaker's gender or speaking rate. Therefore, for the computation and extraction of relevant parameters we claim the use of both fully automatic methods and methods that require user interaction.

As long as the confidence scores do not change significantly, the current HM acoustic model(s) 7 are used by the recognizer for the decoding of the incoming speech signal 8. If one or more new environments are detected in 6, the transformations $T_j$ associated with these environments are applied, and the transformed acoustic models are used for decoding. For that purpose, the confidence scores are ranked and only transformations for the M best scoring environments are considered for further processing. It is important to notice that the number M of environments under consideration can vary:

If the confidence scores do not allow an unambiguous identification of an environment, M may be large.

If the workload—for which the computation and distribution is known in prior art and is present in any modern operating system—of the device or the (remote) recognition server, respectively, is already high, M will be small in order to achieve acceptable response times (at cost of recognition accuracy).

Further, the obtained confidence scores are also used during the recognizer combination 8, which can be utilized to achieve better recognition accuracy. As mentioned above, state-of-the-art speech recognizers comprise three main processing stages: feature extraction, labelling of the speech frames, and decoding. While in the present invention the use of a single feature vector is proposed, combination can take place either in the labeller denoted with reference sign 8a or in the decoder denoted with reference sign 8b in FIG. 1. In the first case normalized confidence scores are used to augment the HMM output probabilities in Eqn. 4:

$$\hat{p}(x|S_i) = X_{jk}(z) \cdot p(x_k|S_i),$$

and in case of a combination of word hypothesis the confidence measure can be used to resolve ties, which may occur if each recognizer produces a different result for a given interval of the speech signal. In this case it is proposed to assign the transcription obtained from the best scoring recognizer to the portion of the speech signal under consideration.

With additional reference to FIG. 2 an overview of the inventional basic concept is given in an exemplary application of the foregoing embodiment in the field of telematics, applied in an embedded system in a car.

In a first block 205 the sensor data—selection base data—coming from four sensor devices is read from the physical devices and quantized such that data is available for program evaluation.

Thus, the collected selection base data represents the following evaluable statements:
1. "Driver is female", from a camera having an enclosed image recognizer tool, —210,
2. "car's speed is 130 km/h"; —220
3. "Air-Condition is ON, and the ventilator runs at 75% power, —230.
4. radio is ON, and runs on volume-level 4 of 8, and plays music of the classic style, —240.

Then in a step 250, a lookup in the database is done, leading to a decision that a dataset is stored in which 3 of 4 conditions are met. Thus, the model combination associated with this dataset is reserved as one of the most probable recognizer combinations.

Then in a step 260, the program-controlled arbiter means provided by the invention is used for evaluating the collected data, the scores are determined for the plurality of model combinations making sense in this example, step 270. Then, in step 280, the currently available computational load is determined. The result may yield that a maximum of 2 model combinations are allowed to be used for speech recognition although the three best scored proposals suggest a combination of 4 models. This limitation might be assumed due to the priority of two other activities having a higher priority than speech recognition.

Thus, in a next step 290 the best suited recognizer combination is selected having only two models. This requires a new scoring process.

Then in a step 300 the transformations are selected for calculating the selected best two models. The rest is done according to the above description.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system—is able to carry out these methods.

Computer program means or computer program in the present context mean any expression, in any language, code or notation, of a set of instructions intended to cause a system having an information processing capability to perform a particular function either directly or after either or both of the following
  a) conversion to another language, code or notation;
  b) reproduction in a different material form.

The invention claimed is:

1. A method for operating a speech recognition system, in which a program-controlled recognizer performs the steps of:
  dissecting a speech signal into frames and computing any kind of feature vector for each frame;
  labeling frames by characters or groups of them yielding a plurality of labels per phoneme; and
  decoding said labels according a predetermined acoustic model to construct one or more words or fragments of a word,
  wherein a plurality of recognizers are accessible to be activated for speech recognition, and are combined in order to balance the results of speech recognition done by a single recognizer, the method further comprising:
  a) collecting selection base data characterizing speech recognition boundary conditions with sensor means;
  b) using program-controlled arbiter means for evaluating the collected data; and
  c) selecting the best suited recognizer or a combination thereof out of the plurality of available recognizers according to said evaluation.

2. The method according to claim 1, in which said sensor means is one or more of:
  a decision logic, including software program, physical sensors or a combination thereof.

3. The method according to claim 1, further comprising the steps of:
  a) processing a physical sensor output in a decision logic implementing one or more of statistical tests, decision trees, and fuzzy membership functions; and
  b) returning from said process a confidence value to be used in the sensor select/combine decision.

4. The method according to claim 1, in which selection base data which have led to a recognizer select decision, is stored in a database for a repeated fast access thereof in order to obtain a fast selection of recognizers.

5. The method according to claim 1, further comprising the step of:
  selecting the number and/or combination of recognizers dependent of the current processor load.

6. The method according to claim 1, further comprising the step of:
  storing the mapping rule how one acoustic model is transformed to another one, instead of storing a plurality of models themselves.

7. A computer system comprising:
  means for dissecting a speech signal into frames and computing any kind of feature vector for each frame;
  means for labeling frames by characters or groups of them yielding a plurality of labels per phoneme;
  means for decoding said labels according a predetermined acoustic model to construct one or more words or fragments of a word,
  wherein a plurality of recognizers are accessible to be activated for speech recognition, and are combined in order to balance the results of speech recognition done by a single recognizer, the computer system carrying out the method of:
  a) collecting selection base data characterizing speech recognition boundary conditions with sensor means;
  b) using program-controlled arbiter means for evaluating the collected data; and
  c) selecting the best suited recognizer or a combination thereof out of the plurality of available recognizers according to said evaluation.

8. The system according to claim 7, in which said sensor means is one or more of:
  a decision logic, a software program, physical sensors or a combination thereof.

9. A computer program for execution in a data processing system comprising computer program code portions for performing respective steps:
  dissecting a speech signal into frames and computing any kind of feature vector for each frame;
  labeling frames by characters or groups of them yielding a plurality of labels per phoneme; and
  decoding said labels according a predetermined acoustic model to construct one or more words or fragments of a word,
  wherein a plurality of recognizers are accessible to be activated for speech recognition, and are combined in order to balance the results of speech recognition done by a single recognizer, the method further comprising:
  a) collecting selection base data characterizing speech recognition boundary conditions with sensor means;
  b) using program-controlled arbiter means for evaluating the collected data; and
  c) selecting the best suited recognizer or a combination thereof out of the plurality of available recognizers according to said evaluation,
  when said computer program code portions are executed on a computer.

10. The computer program according to claim 9, in which said sensor means is one or more of:
  a decision logic, a software program, physical sensors or a combination thereof.

11. A computer program product stored on a computer usable medium comprising computer readable program means for causing a computer to perform the steps of:
  dissecting a speech signal into frames and computing any kind of feature vector for each frame;
  labeling frames by characters or groups of them yielding a plurality of labels per phoneme; and
  decoding said labels according a predetermined acoustic model to construct one or more words or fragments of a word,
  wherein a plurality of recognizers are accessible to be activated for speech recognition, and are combined in order to balance the results of speech recognition done by a single recognizer, the method further comprising:
  a) collecting selection base data characterizing speech recognition boundary conditions with sensor means;
  b) using program-controlled arbiter means for evaluating the collected data; and
  c) selecting the best suited recognizer or a combination thereof out of the plurality of available recognizers according to said evaluation,
  when said computer program product is executed on a computer.

12. The computer program product according to claim 11, in which said sensor means is one or more of:
  a decision logic, a software program, physical sensors or a combination thereof.

* * * * *